United States Patent [19]

Jokimies et al.

[11] Patent Number: 5,581,244
[45] Date of Patent: Dec. 3, 1996

[54] PAGING MESSAGE PROCESSING

[75] Inventors: Matti Jokimies, Salo; Ilkka Heikkila, Märynummi, both of Finland

[73] Assignee: Nokia Mobile Phones Ltd., Salo, Finland

[21] Appl. No.: 336,976

[22] Filed: Nov. 10, 1994

[30] Foreign Application Priority Data

Nov. 26, 1993 [FI] Finland ................................. 935270

[51] Int. Cl.⁶ ..................................................... G08B 5/22
[52] U.S. Cl. .................................... 340/825.44; 455/38.3
[58] Field of Search ...................... 340/825.03, 825.44; 379/57, 58, 205; 455/38.3

[56] References Cited

U.S. PATENT DOCUMENTS

| | | | |
|---|---|---|---|
| 4,845,491 | 7/1989 | Fascenda et al. | 340/825.44 |
| 5,153,903 | 10/1992 | Eastmond et al. | 379/57 |
| 5,291,542 | 3/1994 | Kivari et al. . | |
| 5,378,935 | 1/1995 | Korhonen et al. . | |
| 5,471,655 | 11/1995 | Kivari . | |
| 5,491,718 | 2/1996 | Gould et al. . | |

OTHER PUBLICATIONS

Finnish Office Action and English Translation thereof, dated 7 Sep. 1994, Application No. 935270, Applicant: Nokia Mobile Phones Ltd.

Primary Examiner—Michael Horabik
Assistant Examiner—Edward Merz
Attorney, Agent, or Firm—Perman & Green

[57] ABSTRACT

A mobile station, i.e., mobile phone included in a cellular telephone system processes paging messages using a dual-port RAM memory connected between a signal processor (DSP) and a microprocessor (MCU). The paging message received and coded by the signal processor is transferred to the RAM memory, the identity number contained by the paging message is compared with the identity number of the microprocessor at the same time in the signal processor and microprocessor and only when they are congruent, the microprocessor is activated through a separate interrupt line. Because most paging messages are either empty messages or intended for other mobile stations, the microprocessor (MCU) can remain on as low a power level as possible during the paging of messages while the mobile station is in the stand-by state.

10 Claims, 2 Drawing Sheets

PAGING MESSAGE PROCESSING

FIELD OF INVENTION

The present invention relates to an apparatus and method for processing paging messages received by portable devices such as radio telephones or message page.

BACKGROUND OF INVENTION

It is a well known aim for designers of portable devices to minimize the power consumption of such devices, e.g. radio telephones, in order to increase the interval between the charging and replacing of the batteries for the portable devices. Additionally, the likelihood of the portable device ceasing operation during a working cycle is reduced if power consumption is minimized. Therefore, portable devices, particularly radio telephones, are designed so that different power-consuming parts can be shut off when not required so that only the necessary parts required to "activate" the portable device are switched on. In a portable communication system, the portable devices are paged by radio transmitted paging messages. The so-called paging messages are transmitted using paging channels of the communication system to the portable devices, e.g. cellular telephone, inside a given cell in different systems. The cellular telephone recognizes, on the basis of these messages, whether or not there is an incoming call for that cellular telephone i.e., whether certain parts of the cellular telephone should be activated. These paging messages are typically transmitted, for example, as signal blocks, signal bursts or as an FSK-modulation bit stream, using a continuous carrier wave. The particular implementation depends on the communication system. Typically, such communication systems have discontinuous reception (DRX), i.e., parts of the cellular telephone are switched off between paging messages and also during paging messages. This is the case when the cellular telephone is in the so-called idle state (stand-by).

In the stand-by state the power consumption of cellular telephones is mainly due to the receiving and handling of paging messages. Generally the power consumption is reduced by the power being switched off between paging message blocks, but power consumption should be minimized also during paging message blocks or bursts.

In known digital cellular telephones, for example, the reception of paging messages is carried out in the following manner, Paging messages are received and decoded in a digital signal processor (DSP) and the decoded bits are subsequently analyzed in the microprocessor (MCU). A parallel or serial bus is generally provided between the microprocessor and the digital signal processor. A drawback in this process is that the whole reception chain is switched on during or after the reception of a paging message block. Additionally, the majority of paging messages do not require any activity from the cellular telephone because they are either so-called empty messages or paging messages for other cellular telephones.

A known improvement on the above method is one where relevant paging messages are partly detected in the signal processor DSP and any blocks which require activity are then forwarded to the microprocessor for full processing. A drawback here is that because the signal processor has to transmit the information to the microprocessor, this information is written into the memory twice, the first time into the memory of the DSP and the second time the same information is written into the memory of the MCU. Therefore, both the microprocessor and the signal processor have to be switched on or they have to use a higher clock frequency for a longer period of time if the microprocessor is one which does not have a halt mode. Another disadvantage is that the MCU and/or its peripheral interface circuits (serial/parallel ports, DMA Direct Memory Access controller, etc.) have to be activated in order to transfer the paging information into the memory of the MCU. The MCU can start processing the data only after the whole message has been transferred to the RAM area for the received messages.

SUMMARY OF THE INVENTION

In a first aspect of the present invention there is provided a method for processing paging messages comprising:

a partially activated microprocessor (MCU) transmitting a first identity number to a signal processor (DSP);

the signal processor decoding a received paging message;

the signal processor (DSP) comparing the decoded received paging message with the first identity number; and fully activating the microprocessor if the decoded received message paging message corresponds to the first identity number, and in a second aspect there is provided apparatus for processing paging messages comprising:

a signal processor (DSP);

a microprocessor (MCU) with related memory;

a joint dual-port RAM memory coupled to the signal processor (DSP) and the microprocessor (MCU);

the signal processor (DSP) comprising means for comparing an identity number contained in the paging message with a first identity number obtained from the microprocessor (MCU), and control means for fully activating the microprocessor if the first identity number corresponds to the identity number contained in the paging message.

A method and apparatus in accordance with the present invention has the advantage that unnecessary data transmission between the signal processor and microprocessor is reduced thereby reducing power consumption and increasing battery life. Additionally, the processing time of the signals is reduced. The dual port RAM is a fast device and thus the signal processor can fully activate microprocessor at the very moment the data to be processed is available.

The invention is now described in detail, by way of example only, and with reference to the accompanying drawings.

DETAILED DESCRIPTION OF THE EMBODIMENT OF THE INVENTION

Figure 1:
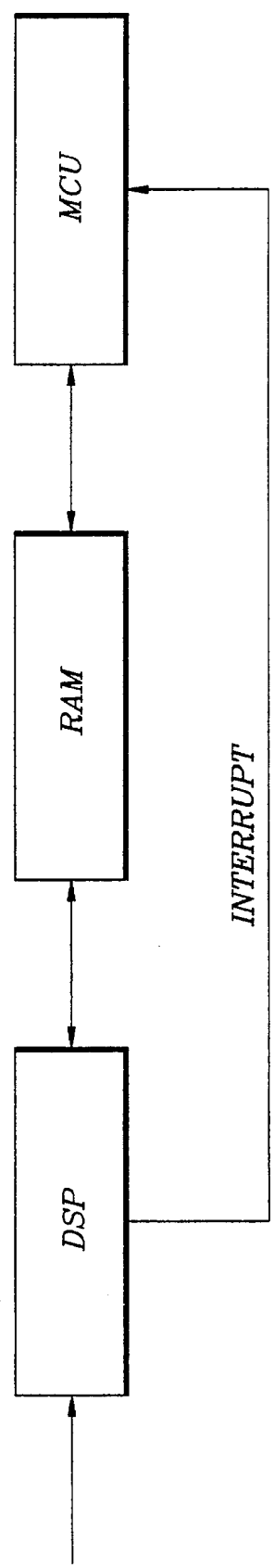
FIG. 1 shows a circuit diagram in accordance with the invention.

A paging message transmitted by a base station on a paging channel is received in the RF section of a cellular telephone, after which the detected signal is transferred to the digital signal processor DSP illustrated in FIG. 1. The paging message contains the identity number of a cellular telephone. Paging messages are not received continuously and generally the pause between the messages is longer than the actual messages. For instance, in the GSM system, a paging message block is transmitted at intervals of 0.5–2 seconds while the length of the actual block is about 20 milliseconds (the block contains four bursts of 0.577 ms each, where the gap between each burst is 4.615 ms). If there is no need to search for or page a cellular telephone, an empty frame of a predetermined type can be used.

When the cellular telephone is in stand-by, it has to receive paging messages at predetermined moments and the receiving circuit can be switched off between these moments either partially or completely.

Figure 2:
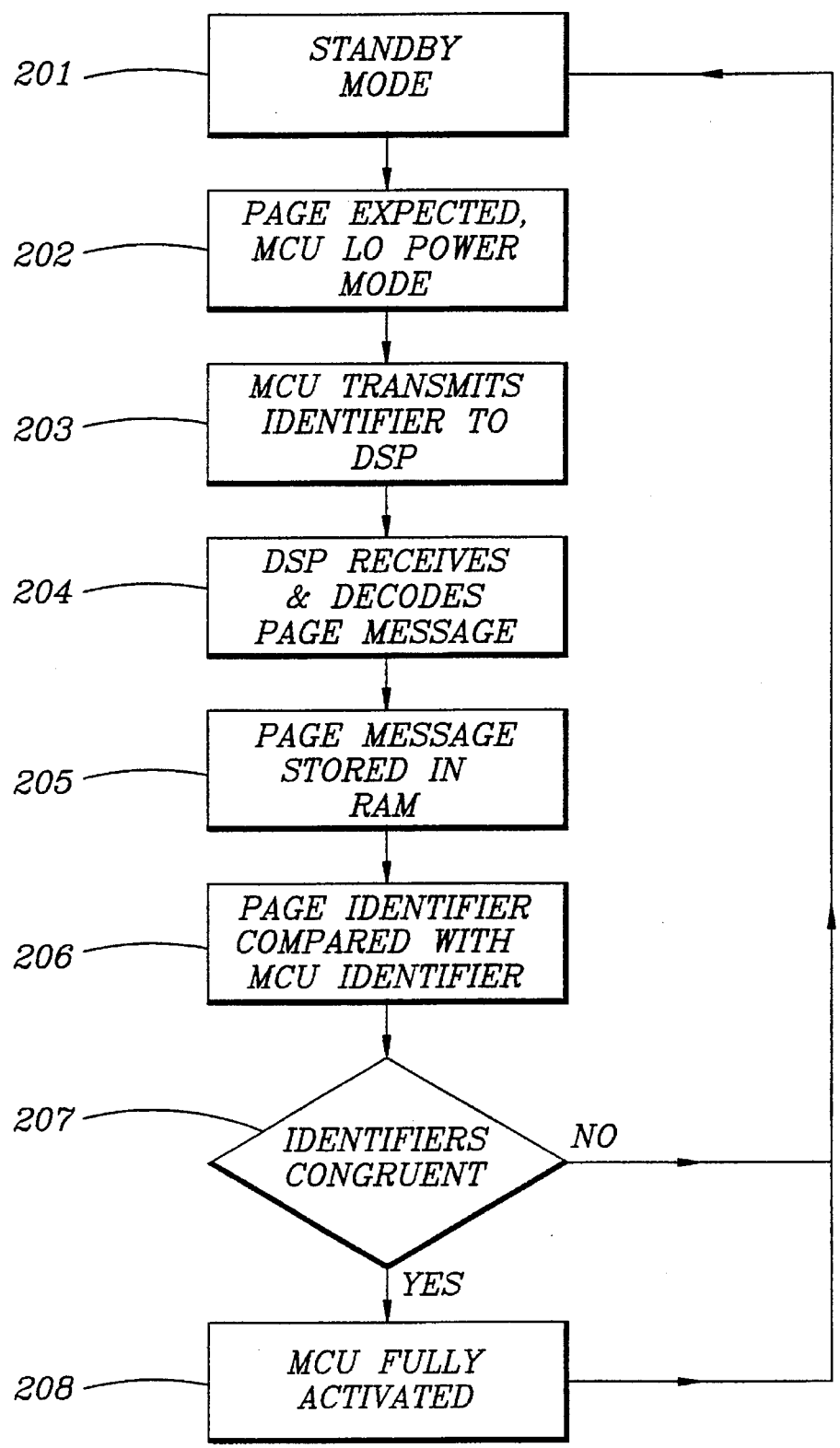
FIG. 2 shows a flowchart of the steps taken in accordance with the invention.

The paging message is received in the RF section of the cellular telephone and then sent to the signal processor DSP where it is decoded and transferred to the dual-port RAM memory. The microprocessor is activated only when needed. The operation of apparatus in accordance with the invention is shown in FIG. 2.

At step 201, the cellular telephone is in standby mode, and at 202 a paging message is expected and the MCU is in a lower power mode. At 203 the MCU transmits the identifier of the mobile station (for instance, identity number TMSI or IMSI) or a part thereof to the DSP. Then, the DSP receives and decodes the paging message block 204 and places it in the dual-port RAM memory 205. The identifier received via the RF part from the outside is compared in the DSP with the identifier obtained internally from the MCU at step 206. If the numbers are congruent, the DSP activates the MCU through the interrupt and the MCU further directs the other necessary parts of the mobile station to be switched on 207, 201 and if the identifiers are not congruent, the DSP does not activate the MCU, and the MCU remains on as low a power level as possible in its standby mode. After having completed whatever functions are necessary having been fully activated, the MCU returns to its standby mode.

The identity number can be, for instance, in the GSM system a so-called IMSI (International Mobile Subscriber Identity) or a TMSI (Temporary Mobile Subscriber Identity). However, independent of whether the system in question is digital or analog, and in the case of digital systems whether it is GSM or some other system, it is typical that some kind of an identifier of the mobile station comes along with the paging message.

It can be further stated here that if the paging message contains a so-called empty message (for instance, a filler frame) the DSP verifies this and ignores the block.

In a cellular telephone operating in accordance with the invention, the MCU can be on a low power level until it receives an interrupt signal from the DSP. The interrupt signal can be transmitted to the MCU by other means providing the DSP has first compared the identifiers or parts thereof.

The invention can be applied both in digital and analog cellular telephone systems, In view of the foregoing description it will be evident to a person skilled in the art that various modifications may be made within the scope of the invention. For example, this dual-port RAM can be a separate circuit or it can constitute a part of any IC of the cellular phone, and dual-port RAM memory can also be used to transfer other messages between the MCU and the DSP.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A method for processing paging messages comprising:

a partially activated microprocessor (MCU) transmitting a first identity number to a signal processor (DSP);

the signal processor decoding a received paging message;

the signal processor (DSP) comparing the decoded received paging message with the first identity number independently of said microprocessor; and fully activating the microprocessor if the decoded received message paging message corresponds to the first identity number.

2. A method according to claim 1, wherein the decoded received paging message is transmitted to a dual port RAM for the microprocessor MCU and signal processor DSP.

3. A method according to claim 1, wherein the microprocessor MCU is fully activated by an interrupt signal from the signal processor DSP.

4. A method according to claim 1, wherein so-called empty paging messages are identified by the signal processor and are not processed.

5. A method according to claim 1, wherein the paging message is received at intervals as a signal cluster.

6. Apparatus for processing paging messages comprising:

a signal processor (DSP);

a microprocessor (MCU) with related memory;

a joint dual-port RAM memory coupled to the signal processor (DSP) and the microprocessor (MCU);

the signal processor (DSP) comprising means for comparing an identity number contained in the paging message with a first identity number obtained from the microprocessor (MCU), and control means for fully activating the microprocessor if the first identify number corresponds to the identity number contained in the paging message.

7. Apparatus according to claim 6, wherein the RAM is adapted to transmit parallel signals between the signal processor (DSP) and the microprocessor (MCU) and to receive messages processed by the signal processor.

8. Apparatus according to claim 6, wherein the microprocessor (MCU) is fully activated by an interrupt signal from the signal processor (DSP).

9. Apparatus according to claim 6, wherein the dual-port RAM memory is a separate circuit, or is contained in another integrated circuit of associated circuitry or is integral with one or other of the signal processor (DSP) and microprocessor (MCU).

10. Apparatus according to claim 6, wherein the paging message is periodically received as a signal cluster.

* * * * *